US008261226B1

(12) United States Patent
Becker et al.

(10) Patent No.: US 8,261,226 B1
(45) Date of Patent: Sep. 4, 2012

(54) NETWORK FLOW BASED MODULE BOTTOM SURFACE METAL PIN ASSIGNMENT

(75) Inventors: Wiren Dale Becker, Hyde Park, NY (US); Ruchir Puri, Baldwin Place, NY (US); Haoxing Ren, Austin, TX (US); Hua Xiang, Ossining, NY (US); Tingdong Zhou, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/187,196

(22) Filed: Jul. 20, 2011

(51) Int. Cl.
*G06F 17/50* (2006.01)
(52) U.S. Cl. ........................ 716/126; 716/118
(58) Field of Classification Search .................. 716/118, 716/126
See application file for complete search history.

(56) References Cited

U.S. PATENT DOCUMENTS

| | | | |
|---|---|---|---|
| 6,434,721 B1* | 8/2002 | Chiluvuri et al. ................ | 716/55 |
| 7,533,360 B1 | 5/2009 | Ren | |
| 7,594,212 B1* | 9/2009 | Gaitonde et al. .............. | 716/124 |
| 7,614,028 B1* | 11/2009 | Nequist et al. ................. | 716/126 |
| 2003/0023944 A1* | 1/2003 | Erickson et al. ................ | 716/15 |
| 2005/0114821 A1 | 5/2005 | Petunin | |
| 2006/0242614 A1 | 10/2006 | Wadland | |
| 2007/0022398 A1 | 1/2007 | Haridass | |
| 2008/0034342 A1 | 2/2008 | Petunin | |

FOREIGN PATENT DOCUMENTS
KR 2005099170 10/2005

OTHER PUBLICATIONS

R. K. Ahuja, et al., "Finding minimum-cost flows by double scaling", Mathematical Programming 53, pp. 243-266, 1992.
R. K. Ahuja, et al., "Network Flows", Prentice Hall, 1993.
T. H. Cormen, et al., "Introduction to Algorithm", Cambridge, MA: MIT press, 1992.
H. Gabow, "An efficient implementation of Edmond's algorithm for maximum weight matching on graphs", Journal of the ACM, vol. 23,Issue 2, pp. 221-234, Apr. 1976.

(Continued)

*Primary Examiner* — Suresh Memula
(74) *Attorney, Agent, or Firm* — Preston J. Young; Otterstedt, Ellenbogen & Kammer, LLP

(57) ABSTRACT

A scaled network flow graph is constructed, including a plurality of nodes and a plurality of edges. The plurality of nodes correspond to: (i) a pseudo device pin node for each pair of corresponding paired device pins; (ii) a pseudo bottom surface metal node for each pair of bottom surface metal pins on each of multiple routing layers; (iii) a source node connected to each of the pseudo device pin nodes; (iv) a sub-sink node for each pair of the paired bottom surface metal pins (each of the sub-sink nodes is connected to corresponding ones of the pseudo bottom surface metal nodes for each of the pairs of bottom surface metal pins on each of the multiple routing layers); and (v) a sink node connected to the sub-sink nodes. A capacity and a cost are assigned to each of the edges of the scaled network flow graph. A min-cost-max-flow technique is applied to the scaled network flow graph with the assigned capacities and costs to obtain an optimal flow solution. The paired bottom surface metal pins are assigned to the corresponding paired device pins, and routing connections therebetween are assigned, in accordance with the optimal flow solution. A technique for use in the absence of pairing constraints is also provided, as is a pin-pairing technique.

25 Claims, 12 Drawing Sheets

OTHER PUBLICATIONS

J. Hershberger et al., "Efficient breakout routing in printed circuit boards", Proceeding of 13th. Annual Symposium on Computational Geometry, 1997.

H. Kong, T. Yan, et al., "Automatic bus planner for dense PCBs", Proceeding of Design Automation Conference, Jul. 2010.

L. Luo, et al., "Ordered escape routing based on boolean satisfiability", Proc. of ASP-DAC, pp. 244-249, 2008.

W.-K. Mak, "I/O placement for FPGAs with multiple I/O standards", IEEE Trans. on Computer-Aided Design of Integrated Circuits and Systems, vol. 23, pp. 315-320, Feb. 2004.

M. M. Ozdal, "Escape routing for dense pin clusters in integrated circuits", Proceeding of Design Automation Conference, 2007.

M. M. Ozdal, et al., Simultaneous escape-routing algorithms for via minimization of high-speed boards,IEEE Trans. Computer-Aided Design, vol. 27, pp. 84-95, Jan. 8.

J. Xiang, et al., "Constraint driven I/O planning and placement for chip-package co-design", ASPDAC, pp. 24-27, 2006.

M. Yu, et al.,"Single-layer fanout routing and routability analysis for ball grid arrays", Proceeding of International Conference on Computer-Aided Design, 1995.

Hua Xiang et al., "Network Flow Based BSM Assignment", Sep. 2009.

* cited by examiner

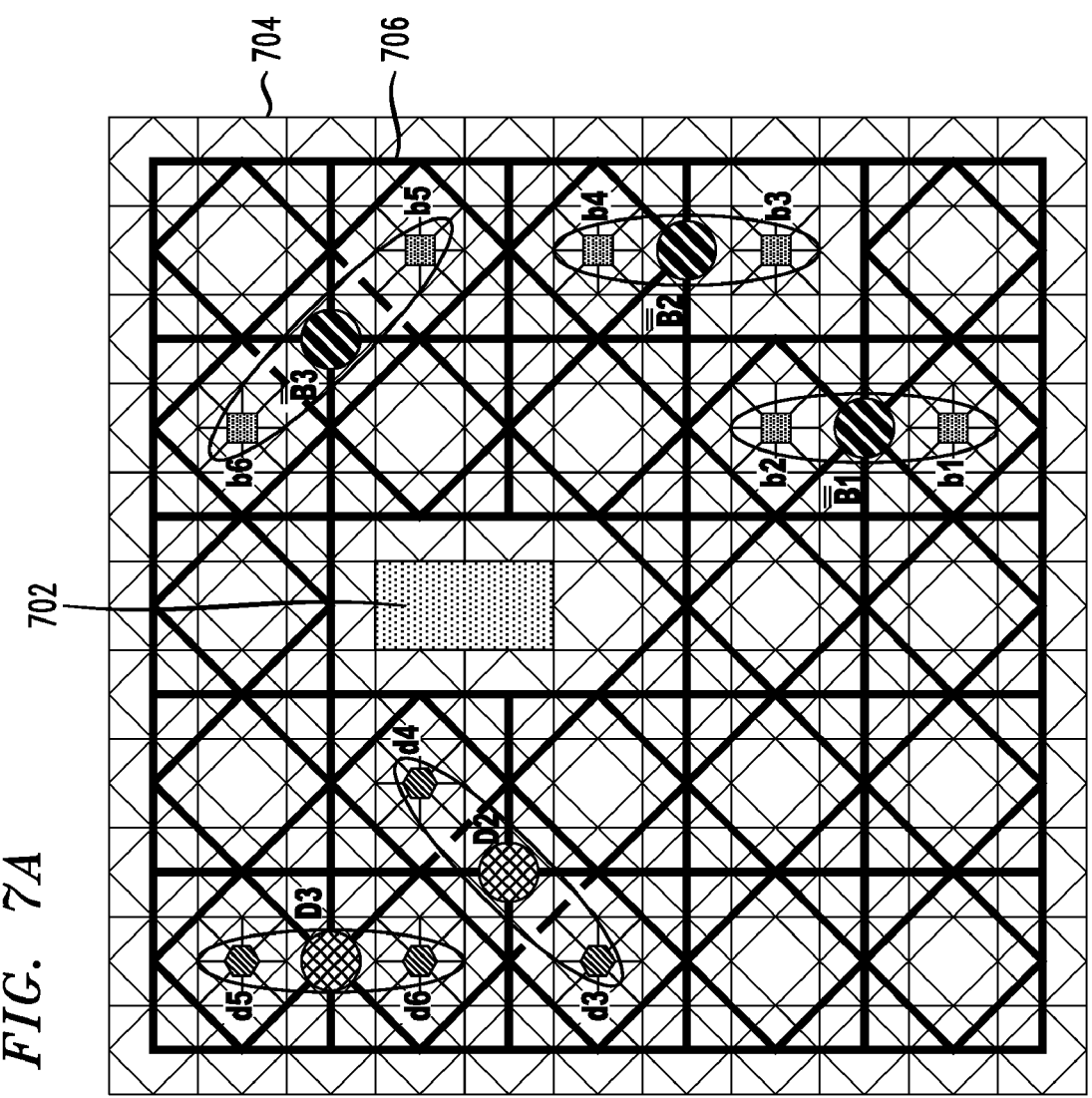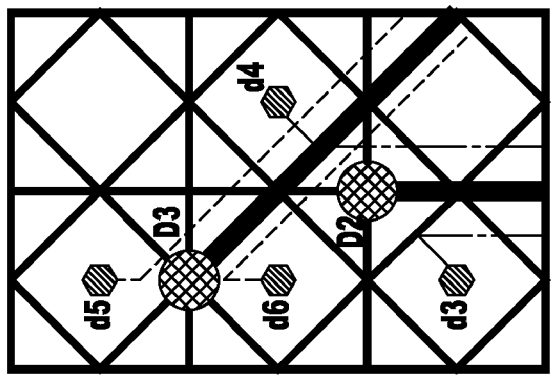

FIG. 14

TEST CASE PROPERTY

| TEST | OUTLINE | LAYERS | BSM PINS | NETS | PAIRS |
|---|---|---|---|---|---|
| TEST 1 | 300x600 | 1 | 108 | 108 | 0 |
| TEST 2 | 300x500 | 2 | 108 | 108 | 0 |
| TEST 3 | 300x600 | 2 | 108 | 108 | 54 |
| TEST 4 | 500x500 | 4 | 108 | 108 | 54 |
| TEST 5 | 376x340 | 4 | 624 | 624 | 312 |

FIG. 15

TEST RESULTS

| TEST | ASSIGNED BSMs | TOTAL WIRELENGTH | | RUN TIME(S) | |
|---|---|---|---|---|---|
| | | NO PAIRS | WITH PAIRS | NO PAIRS | WITH PAIRS |
| TEST 1 | 108 | 29396.8 | - | 139 | - |
| TEST 2 | 108 | 25057.6 | - | 142 | - |
| TEST 3 | 108 | 24921.2 | 25132.8 | 168 | 28 |
| TEST 4 | 108 | 24916.0 | 25132.8 | 261 | 63 |
| TEST 5 | 624 | 130402.4 | 131592.0 | 2145 | 148 |

NETWORK FLOW BASED MODULE BOTTOM SURFACE METAL PIN ASSIGNMENT

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic and computer arts, and, more particularly, to design automation and the like.

BACKGROUND OF THE INVENTION

In current industry practice, Bottom Surface Metals (BSM) pin assignment for high frequency signals on a package device is a tedious manual job. It is often necessary to change the assignment multiple times in order to produce a routable solution. The printed circuit boards (PCBs) of high performance server processor boards are used to mechanically support and electrically connect high speed devices such as Dual In-Line Memory Modules (DIMMs), Input/Output (IO) chips, and Multi-Chip Modules (MCM) which house several processor chips and their caches. The interconnects between these devices are often high speed signals which have to be routed on one or more PCB layers.

SUMMARY OF THE INVENTION

Principles of the invention provide techniques for network flow based module bottom surface metal pin assignment. In one aspect, an exemplary method for assigning bottom surface metal pins to corresponding device pins on at least one outside device, using multiple routing layers, and without pairing constraints, includes the step of constructing a network flow graph including a plurality of nodes and a plurality of edges. The plurality of nodes correspond to: (i) a device pin node for each of the corresponding device pins; (ii) a node for each of the bottom surface metal pins on each of the multiple routing layers; (iii) a source node connected to each of the device pin nodes; (iv) a sub-sink node for each of the bottom surface metal pins (each of the sub-sink nodes is connected to corresponding ones of the nodes for each of the bottom surface metal pins on each of the multiple routing layers); and (v) a sink node connected to the sub-sink nodes. A capacity and a cost are assigned to each of the edges of the network flow graph. A min-cost-max-flow technique is applied to the network flow graph with the assigned capacities and costs to obtain an optimal flow solution. The bottom surface metal pins are assigned to the corresponding device pins, and routing connections there-between are assigned, in accordance with the optimal flow solution.

In another aspect, an exemplary method for pairing bottom surface metal pins includes the step of constructing a bottom surface metal pin neighboring graph having a plurality of nodes and a plurality of edges. The plurality of nodes correspond to the bottom surface metal pins. The plurality of edges connect neighboring pairs of the bottom surface metal pins. For each of the edges connecting given neighboring pairs of the nodes that are diagonal neighbors, a weight is assigned equal to the absolute value of the number of the plurality of edges. For each of the edges connecting given neighboring pairs of the nodes that are not diagonal neighbors, a weight is assigned equal to one plus the absolute value of the number of the plurality of edges. A max-weight-matching technique is applied to the bottom surface metal pin neighboring graph with the assigned weights to obtain a pairing result. The bottom surface metal pins are paired in accordance with the pairing result.

In a further aspect, an exemplary method for assigning paired bottom surface metal pins to corresponding paired device pins on at least one outside device, using multiple routing layers, includes the step of constructing a scaled network flow graph having a plurality of nodes and a plurality of edges. The plurality of nodes correspond to: (i) a pseudo device pin node for each pair of the corresponding paired device pins; (ii) a pseudo bottom surface metal node for each pair of the bottom surface metal pins on each of the multiple routing layers; (iii) a source node connected to each of the pseudo device pin nodes; (iv) a sub-sink node for each pair of the paired bottom surface metal pins (each of the sub-sink nodes is connected to corresponding ones of the pseudo bottom surface metal nodes for each of the pairs of bottom surface metal pins on each of the multiple routing layers); and (v) a sink node connected to the sub-sink nodes. A capacity and a cost are assigned to each of the edges of the scaled network flow graph. A min-cost-max-flow technique is applied to the scaled network flow graph with the assigned capacities and costs to obtain an optimal flow solution. The paired bottom surface metal pins are assigned to the corresponding paired device pins, and routing connections there-between are assigned, in accordance with the optimal flow solution.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

shorter design time;

better design quality.

These and other features and advantages of the present invention will become apparent from the following detailed description of illustrative embodiments thereof which is to be read in connection with the accompanying drawings.

BRIEF DESCRIPTION OF THE DRAWINGS

FIGS. 7A and 7B depict a scaled graph of a routing layer;

FIG. 14 is a table of test case properties;

FIG. 15 is a table of test results;

DETAILED DESCRIPTION OF PREFERRED EMBODIMENTS

As noted, in current industry practice, Bottom Surface Metals (BSM) pin assignment for high frequency signals on a package device is a tedious manual job. It is often necessary to change the assignment multiple times in order to produce a routable solution.

One or more embodiments provide a network flow based method to automatically assign BSM pins for a module that is wired on multiple Printed Circuit Board (PCB) layers. One or more embodiments construct a network flow graph based on available routing resources, honoring constraints such as wiring and/or BSM blockages. One or more embodiments derive the BSM assignment from the min-cost max-flow solution. The resulting single-ended BSM assignment is typically optimal in terms of routability and the total wire length.

Furthermore, in practice, some high speed signals require differential pairing routing. One or more embodiments provide a two-step approach to handle the differential pairing constraints. The first step is to find the optimal BSM pairing solution, and the second step is to assigns BSMs based on a scaled network flow so that the pairing constraints are honored. Compared to the manual approach, these methods can provide an optimized solution which, in one or more embodiments, significantly reduces the turn-around time of the board design process; for example, from days to minutes.

The PCBs of high performance server processor boards are used to mechanically support and electrically connect high speed devices such as Dual In-Line Memory Modules (DIMMs), Input/Output (IO) chips, and Multi-Chip Modules (MCM) which house several processor chips and their caches. The interconnects between these devices are often high speed signals which have to be routed on one or more PCB layers. Due to the limited available signal layers on a PCB assigned for signal wiring and strict wiring rules for signal integrity, it is challenging to connect a large amount of memory DIMMs to a multi-processor module.

Pin locations have a significant impact on the mutability and congestion of the interconnects, which further affect the chip performance and the board cost. For industry standard devices such as DIMMs, their pin locations are often pre-defined. However, devices such as MCM are custom designed and their pins, so called Bottom Surface Metal (BSM), are assigned by package designers. In practice, the processor module BSM pin assignment for a memory bus is driven by the pin assignment of the memory DIMMs and card floor plan. The same is typically true if there are memory buffers on DIMMs; then, the buffer package BSM pin assignment is also driven by DIMM pin out. The module BSM pin assignment determines the best chip IO C4 (Controlled Collapse Chip Connection) assignment for the best wiring feasibility of the module. Bad BSM assignments will result in scenic routes or require more PCB layers, which sometimes becomes infeasible to manufacture.

Figure 1:
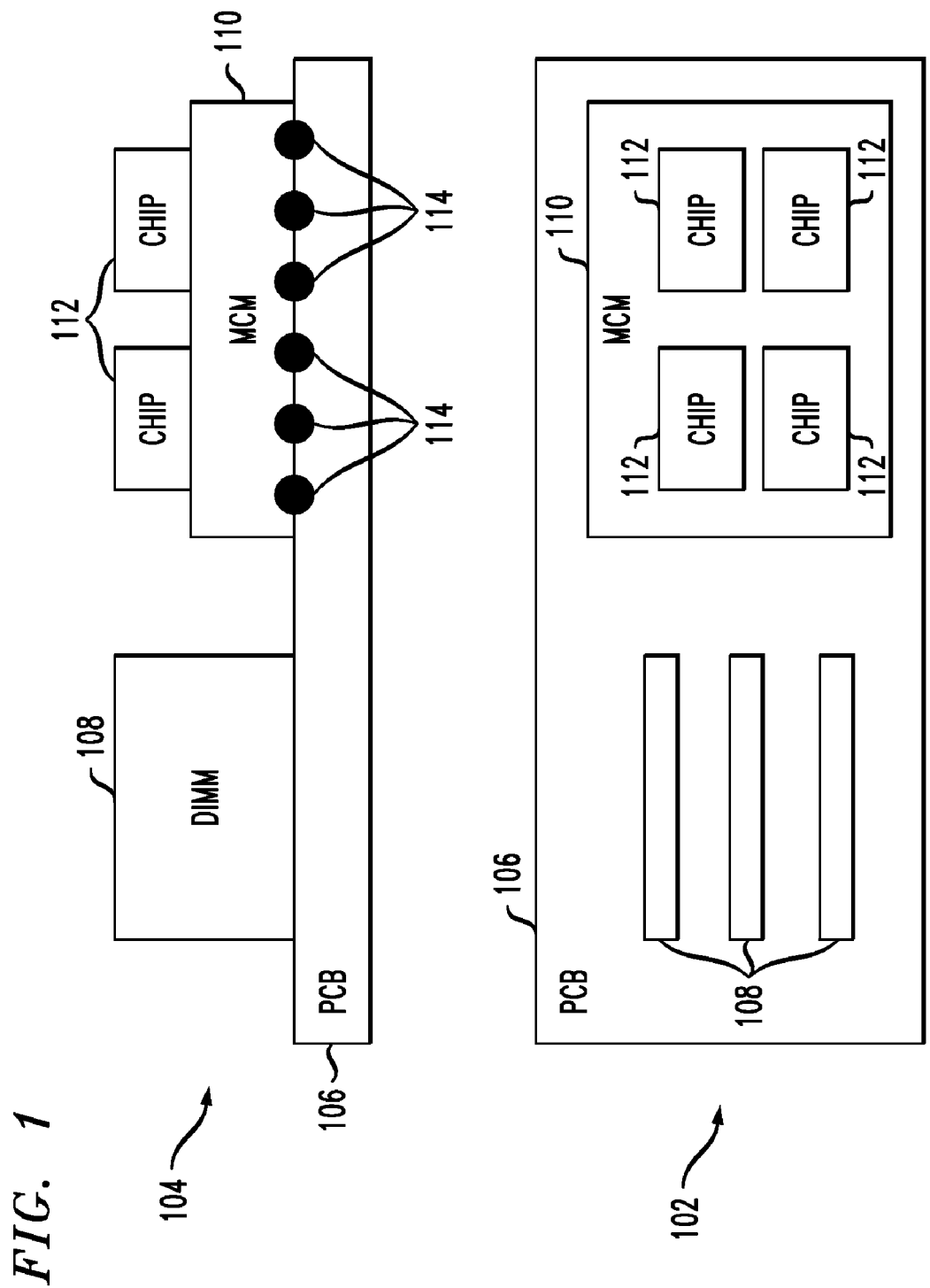
FIG. 1 illustrates exemplary package hierarchy.

FIG. 1 illustrates an exemplary package hierarchy; in particular, a top view 102 and side view 104 of a PCB 106 carrying three DIMMs 108 and one MCM 110 which houses four processor chips 112. The BSMs 114 are at the bottom of the MCM connecting the MCM to the PCB. There are usually thousands of high speed signals between the MCM and the DIMMs, and it is necessary to connect all the wires in a handful of signal layers within the PCB.

There are commercial tools already available for high level early design planning. However, the wiring feasibility assessment and pin assignment are based on "rats" (i.e., the straight line connection between two pins and/or pads) instead of physical wiring with electrical constraints and blockages. One or more embodiments provide a technique with these latter capabilities which advantageously allows designers to productively create a floor plan and interfaces, including connector, module BSM, and chip C4, which are optimized for cost and system performance at a high level design phase. One or more embodiments also significantly reduce wiring surprises during the late design phase.

The current design process for BSM assignment has two steps. The first step is to divide the device BSMs into groups and assign each group to a specific group of signals; for example, assign a BSM group for all the signals on a memory bus. The BSM groups are created such that different design rules can be applied to different kinds of signals. Furthermore, there is less chance that the wires between BSM groups can overlap so that crosstalk between signal types can be controlled. In addition, power delivery to the chips is considered in this step as well. This step is often done manually in a spreadsheet or graphical user interface (GUI) environment. The second step is then to assign the BSMs within each BSM group. This is the most time consuming step because the package designers have to manually fan out the BSMs in the group and line them up with the traces from other devices. The whole process typically needs several days for a processor board having 8 DIMMs. Furthermore, any future change to one BSM assignment requires reassignment of many other BSMs in the same group because the wiring channels are already fully utilized. This makes it very inefficient during the high level design phase when it is desired to see the impact to adjacent domains immediately as one interface has changed.

One or more embodiments advantageously address the second step by assigning BSMs within a BSM group automatically with a CAD (computer-aided design) tool.

One or more embodiments provide a min-cost max-flow based technique which gives an optimal single-ended module BSM assignment solution in terms of routability and wire length for predefined BSM groups wired in multiple PCB layers. One or more embodiments also provide a max-weight matching-based BSM pin pairing technique which gives an optimal pin-pairing solution in terms of maximizing the number of pairs and minimizing the number of diagonal pin pairs. Furthermore, one or more embodiments extend the flow based approach to handle differential pair constraints. In one or more instances, the pair assignment is readily handled as a scaled version of the single ended BSM assignment problem. By splitting the routes on the scaled graph, a BSM pin assignment and routing solution on multiple layers can be derived, and the solution honors the differential constraints and routing blockage constraints.

Problem Formulation

As mentioned above, the BSM assignment process has two steps. The first step is to define the BSM group for each signal group. Each BSM group may contain up to hundreds of signals. The BSM groups are selected to reduce possible wiring overlaps and meet other design requirements. For example, assign a set of BSMs on the left of an MCM to a signal bus coming from the left. After BSM groups are defined, the second step is to assign BSMs in each group. One or more embodiments address the automation of the second step.

For each BSM group, a set of routing resources on a PCB is given, which is defined by the BSM group assignment step. Assuming each BSM group is given completely non-overlapping routing regions, it is possible to solve the BSM assignment problem of each group separately. Therefore, an initial illustration will be provided based on BSM assignment of a single group. For the BSM assignment problem on the entire MCM, it can be readily solved by iteratively applying the exemplary approach on all BSM groups. Each BSM group is assigned to connect to a group of signals from outside devices. In the rest of this specification, it is assumed, by way of a non-limiting example, that those signal nets connect to a DIMM. Therefore, the location and layer of a pin on one end of these nets are predefined. The other end of these nets is BSM and it is necessary to assign each net a BSM from the given BSM group. Although there are multiple routing layers, each net typically needs to be routed completely on a single layer (since stitching vias are typically not allowed for high frequency net routing) In other words, the BSM pins have to be assigned to the same layer as the corresponding DIMM pins.

Furthermore, the latest server designs often use differential pairs as a signaling technique for high frequency signals. The routing paths of differential pairs are required to be close enough; in other words, those paired nets should be routed together and their BSMs should be adjacent. For convenience, neighboring pins are defined as pins with minimum horizontal, vertical, and/or diagonal pitch. The coordinates (x, y, l) are used to represent a DIMM pin. The coordinates (x, y) and l are, respectively, the x and y coordinates and the layer of the DIMM pin. For BSM pins, their locations are known, but their layers are not assigned. Therefore, use (x, y) to represent a BSM pin. Also, let a DIMM (BSM) pin pair p be (d', d'') where d' and d'' are two DIMM (BSM) pins. Furthermore, the routing blockage is described with its four corner coordinates and layer as (xlow, ylow, xhigh, yhigh, layer).

BSM Pin Assignment & Routing on Multiple Layers (BARML): Given a BSM pin group on a set of routing layers, let:
$D=\{d_i|d_i=(x_i,y_i,l_i), i=1 \ldots m\}$ be the DIMM set;
$B=\{b_i|b_i=(x_i,y_i), i=1 \ldots n\}$ be the BSM pin set;
$M=\{m_i|m_i=(xlow_i,xhigh_i,yhigh_i,layer_i), i=1 \ldots k\}$ be regions that no routing is allowed; and
$Pd=\{p_i|p_i(d'_i, d''_i), d'_i \epsilon D, d''_i \epsilon D, i=1 \ldots m/2\}$ be the differential DIMM pairs.

In one or more non-limiting exemplary embodiments, the goal is:
1) The BSM pins can be assigned on different layers, but routing must be completely within on layer, i.e., the routing path between a DIMM pin and a BSM pin must be on the same layer;
2) The routing cannot go through the routing blockage regions;
3) Any BSM pin can only appear on one layer;
4) Only the pins with the minimum horizontal, vertical or diagonal pitch can be paired;
5) The spacing of the two routes for the same pair of nets must be the minimum pitch except the connections to DIMM pins or BSM pins;
6) Find as many routes as possible between DIMM pins and BSM pins; and
7) The total wire length is minimized.

One or more embodiments model the routing resources inside the routing region for a BSM group as a 2-D (two-dimensional) routing grid for each layer. The adjacent grid nodes are connected by edges which represent wire segments. If a region is occupied by a routing blockage, then no edges are created in the corresponding area. The BSM and DIMM pins are located in the centers of routing grids, and their pitch is twice that of the routing pitch. i.e. for any BSM and/or DIMM pin, its location (x,y) satisfies x mod 4=3 and y mod 4=3.

Figure 2:
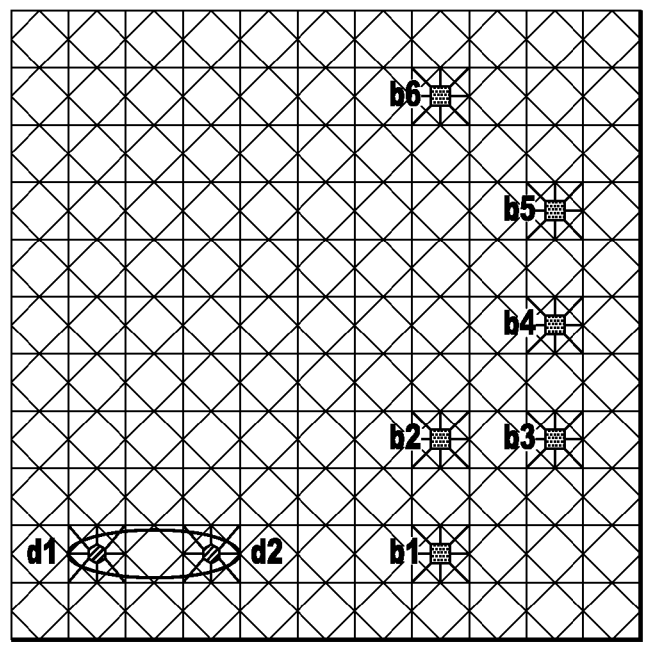
FIG. 2 shows an exemplary BARML problem, including a routing grid for Layer 1.
Figure 3:
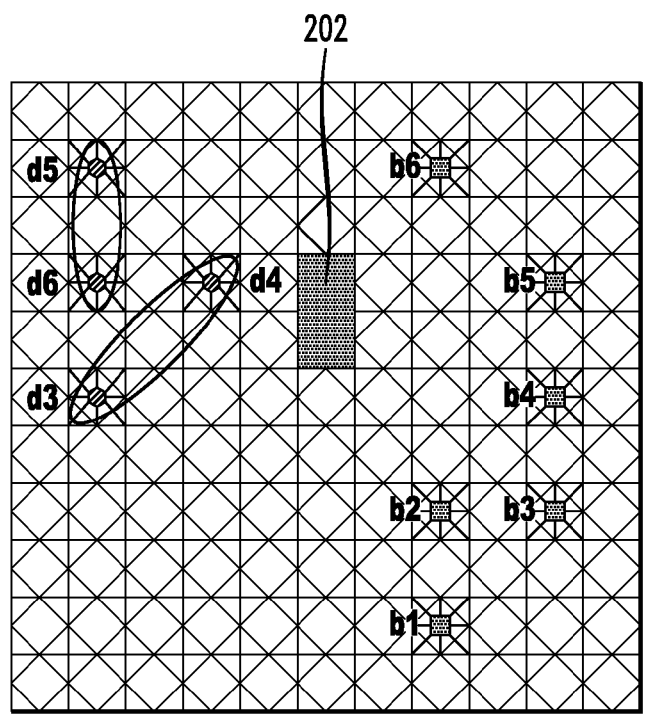
FIG. 3 shows the exemplary BARML problem of FIG. 2, including a routing grid for Layer 2.

FIGS. 2 and 3 give an example of a BARML problem. In this BARML problem, there are two routing layers. The grey area 202 is the routing blockage. On Layer 1 (FIG. 2), there are two DIMM pins d1 and d2, and they are horizontally paired. On Layer 2 (FIG. 3). DIMM pins d3 and d4 are diagonally paired, and d5 and d6 are a vertical DIMM pair. The locations of BSM pins b1~b6 are shown as the tiny squares. Since their layers are not assigned, they appear on both layers. Also, both DIMM pins and BSMs can be accessed from eight directions as illustrated by the four horizontal and/or vertical line segments and the four diagonal line segments. The target is to determine the layer assignment of b1~b6, and assign DIMM pins from d1~d6 for each of the six nets connected to b1~b6.

Thus, by way of review, FIGS. 2 and 3 depict a BARML problem. FIG. 2 shows a routing grid for Layer 1. DIMM pins d1 and d2 are one pair as illustrated by the ellipse. FIG. 3 shows a routing grid for Layer 2. There are two DIMM pin pairs (d3,d4) and (d5,d6). The small squares are the BSM pins. Since their layers are not assigned, they appear on both layers for representation.

BARML without Pairing Constraints

For many designs, there are no pairing constraints on DIMM and/or BSM pins. i.e. $P_d=\emptyset$. This section sets forth an exemplary network flow based optimal technique to solve the BARML problem without pairing constraints. One significant aspect includes construction of a network graph based on the routing grid, and then applying a min-cost max-flow technique to obtain a maximum flow min-cost solution. The skilled artisan will be familiar with the min-cost max-flow technique per se from R. K. Ahuja, T. L. Magnanti, and J. B. Orlin, Network Flows, Prentice Hall, 1993; nevertheless, the same is expressly incorporated herein by reference in its entirety for all purposes. The optimal BARML solution can be directly derived from the network flow. The technique BARML_NO_Pairing is summarized as follows:

Technique for BARML_NO_Pairing(D, B, M)
1. Build the network flow graph G=(V, E);
2. Assign capacity and cost on E;
3. Apply min-cost-max-flow technique on G; and
4. Derive BSM assignment and routing solution.

In the BARML_NO_Pairing technique, a significant task is to construct the flow network. First, two nodes, a source node and a sink node are created. Also, for each BSM pin, a sub-sink node is created. The source node is connected to the DIMM pin nodes. Then, connect the copies of one BSM pin on all layers to the corresponding sub-sink node, and the sub-sink nodes are connected to the sink node. This is to ensure that one BSM pin only appears on one layer. Second, each grid node corresponds to a node in the graph. Next, since the input graph for a min-cost max-flow technique is required to be a directed graph, each edge on the routing grid (except the edges connecting to DIMM pins and BSMs) is represented by two edges with opposite directions. The edges between a BSM pin node and a routing grid node are from the routing grid node to the BSM pin node because the routing ends once the pins are reached. Similarly, the edges between a DIMM pin node and a routing grid node are from the DIMM pin nodes to routing grid nodes.

Figure 4:
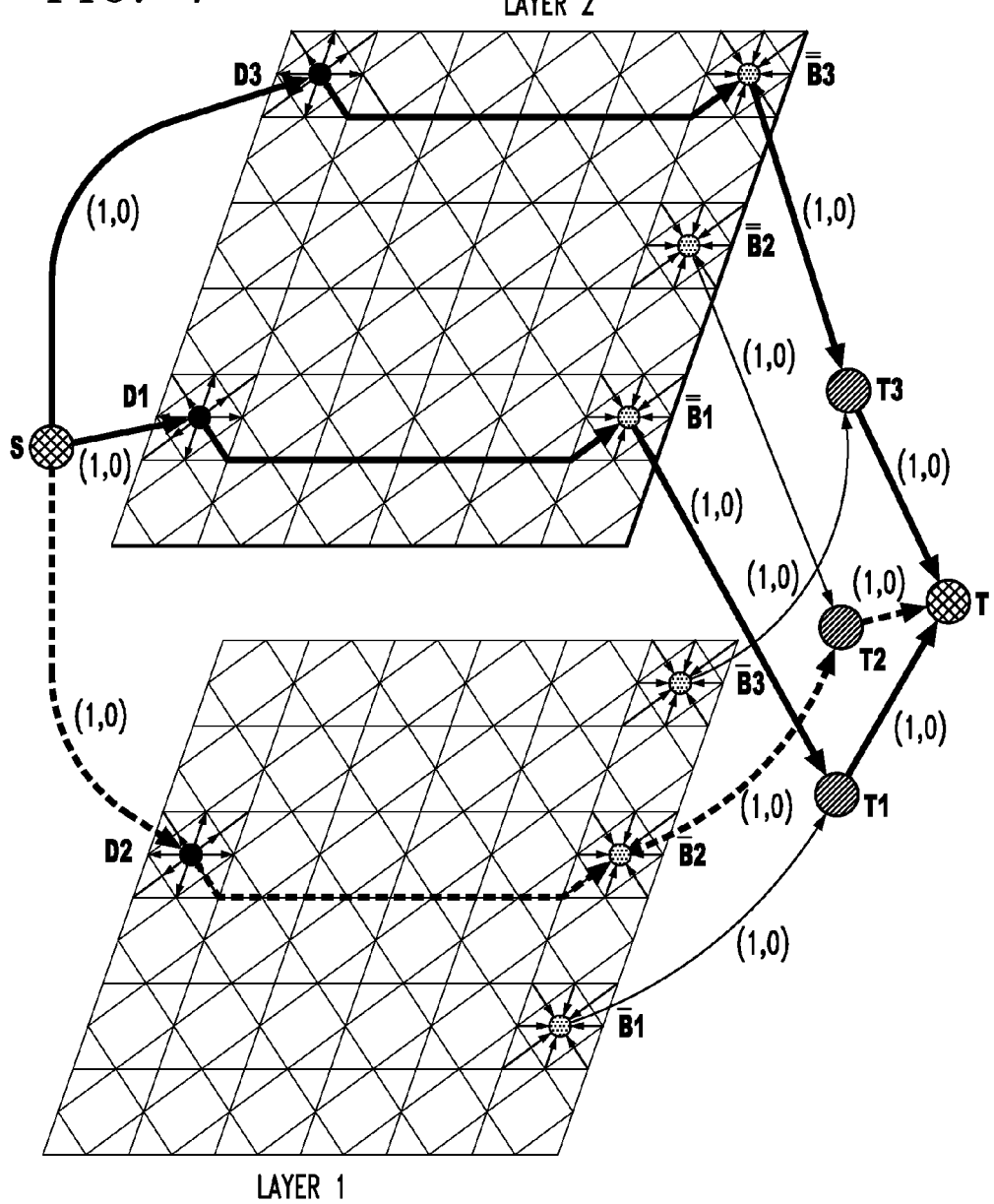
FIG. 4 shows exemplary network flow graph construction.

In this model, each edge and each node have a capacity which specifies how many wires are allowed to go through. To prevent routing crossing, capacity of each edge and the nodes on the grid is set to one since only one route is allowed. Also, each edge in the routing grid is associated with a cost which is determined by the length of the edge segment (e.g., horizontal and/or vertical edges have a cost 10, and diagonal edges have a cost 14). The edge cost helps to shorten the total routing wire length. The edges between a source, sink, and/or subsink node and a DIMM and/or BSM node are artificially created, and their cost is 0. FIG. 4 shows the network flow graph construction for a BARML problem which has no pairing constraints. The two numbers in each number pair on edges are the edge capacity and cost, respectively. In this example, one DIMM pin D2 is on Layer 1, and two DIMM pins D1 and D3 are on Layer 2. In total, there are three nets to get routed. The locations of BSM pins B1, B2 and B3 are given, but their layers are not assigned. Accordingly, they appear on both layers as shown by $\overline{B1}$, $\overline{B2}$, $\overline{B3}$, and, $\overline{B1}$, $\overline{B2}$, $\overline{B3}$ respectively. Furthermore, they are connected to the corresponding subnodes T1, T2 and T3, respectively.

Figure 5:
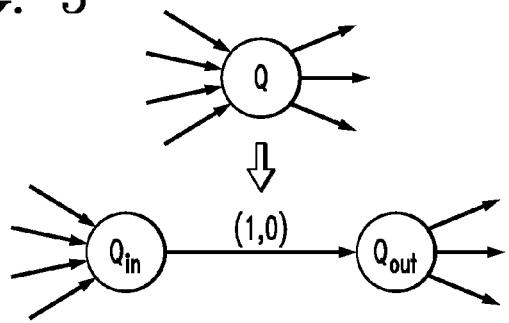
FIG. 5 shows splitting of a node into two nodes.

FIG. 5 shows one node Q split into two nodes $Q_{in}$ and $Q_{out}$. In this way, the node capacity is transformed to the edge capacity. Furthermore in this regard, note that the classical network flow problem only assigns capacities on flow edges. One or more embodiments handle node capacity by splitting the node Q into two nodes $Q_{in}$ and $Q_{out}$. One edge is added between $Q_{in}$ and $Q_{out}$ with a capacity 1 and a cost 0. Then all the original incoming edges are pointed to Qin while all the original out-coming edges are pointed out from Qout.

Once the network flow graph is constructed, the min-cost max-flow technique can be applied to find an optimal flow solution. The BSM assignment is then easily derived from the flow solution. Each flow from the source node to the sink node should pass one DIMM pin node and one BSM node. This BSM is then assigned for the net connected to the DIMM pin. The thick lines in FIG. 4 show the flow solution. The pin assignment solution is (D1,B1), (D2,B2), and (D3,B3).

The optimality of the min-cost max-flow technique guarantees that the maximum number of feasible nets can get connected. Therefore, if the problem has a feasible solution, the technique is guaranteed to return one. Furthermore, the edge cost helps to identify a solution which has the minimum total wire length so that more routing resources can be saved for future usage.

Theorem 1: The BARML_NO_Pairing technique can exactly solve BARML problems which have no pairing constraints. The technique guarantees finding a feasible BSM pin assignment solution as long as one solution exists. Furthermore, the returned solution has the minimum total wire length.

Finding a min-cost max-flow solution in a flow network is a classical problem, and several polynomial techniques are known per se to the skilled artisan, including the following, each of which is expressly incorporated herein by reference in its entirety for all purposes:

R. K. Ahuja, A. V. Goldberg, J. B. Orlin, and R. E. Targan, Finding minimum-cost flows by double scaling, Mathematical Programming 53, pp. 243-266. 1992.

R. K. Ahuja, T. L. Magnanti, and J. B. Orlin, Network Flows, Prentice Hall. 1993.

T. H. Cormen, C. E. Leiserson, and R. L. Rivest, Introduction to Algorithms. Cambridge, Mass.: MIT press, 1992.

Therefore, if the double scaling technique in the "Network Flows" reference is used, the time complexity can be bounded by O(VE log V) where V is the number of nodes in C and E is the number of edges. It is easy to see that both V and E are linearly bounded by the nodes in the routing grid.

BARML with Pairing Constraints

This section describes how to solve BARML problems with pairing constraints. First, an optimal technique is presented to pair BSM pins based on maximum Weight matching. Then a network flow based approach is set forth for BSM pair assignment between BSM pin pairs and DIMM pin pairs on the constructed scaled graph. By splitting the routes on the scaled graph, it is possible to obtain the BSM pin assignment and routing solution on multiple layers, which also honors the differential pairing constraints and routing blockage constraints.

Differential pairing for BSM pins: The BSM pin pairing problem can be defined as follows.

BSMPairing—given a set of pins with locations, find a pairing solution that satisfies:
(1) Only the pins with the minimum horizontal, vertical or diagonal pitch can be paired;
(2) The number of pin pairs is maximized; and
(3) If there are two pairing solutions with the same number of pairs, select the one with a larger number of horizontal and/or vertical pairs.

To find a pairing solution that meets all three of these constraints, one or more embodiments employ the BSM Pin Pairing technique based on maximum weight matching methods:

Technique for BSM Pin Pairing(BSM)
1. Build BSM neighboring graph G=(V, E);
2. $W_d$=1+|E|;
3. $W_d$=|E|;
4. For each edge e=(u,v) in E
5. if u and v are diagonal neighbors
6. set edge weight $W_e$=$W_d$
7. else set edge weight $W_e$=$W_{hv}$
8. Pairs=max-weight-matching-technique(G);
9. return Pairs Based on the BSM pin locations, first construct a pin neighboring graph G=(V,E). For each BSM, a node is created. Then for each pair of neighboring BSM pins, an edge is added into E.

Figure 6A:
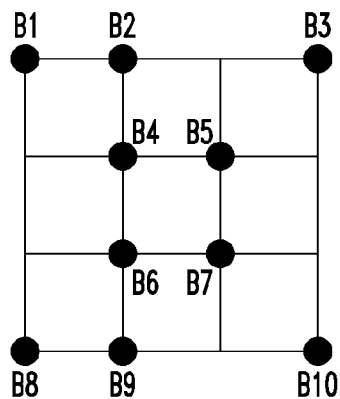
FIGS. 6A-6F depict a BSM pin pairing problem.
Figure 6B:
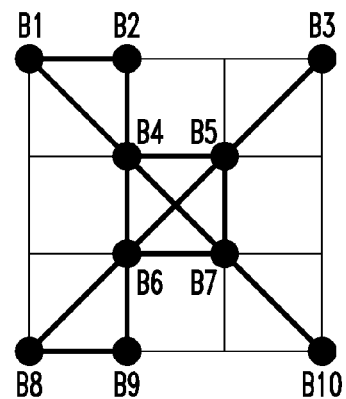

FIGS. 6A-6F depict an example. As seen in FIG. 6A, there are 10 BSM pins as shown by the small circles. The grid represents the distance among pins. One horizontal (vertical) grid correspond to the horizontal (vertical) pitch. FIG. 6B is the corresponding neighboring graph. This graph helps to capture the constraint (1). In order to find the maximum number of pairs, apply the maximum matching technique on this graph. It is straightforward that each matching is one BSM pin pair, and the maximum matching technique will return a solution with the maximum number of pairs. i.e., constraint (2). To address the constraint (3), one intuitive way is to apply the maximum weight matching technique by giving a high weight to horizontal and vertical edges, and a low weight to diagonal edges.

Figure 6C:
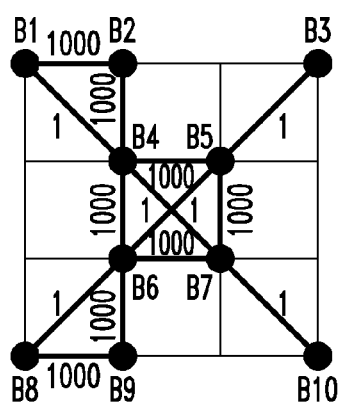
Figure 6D:
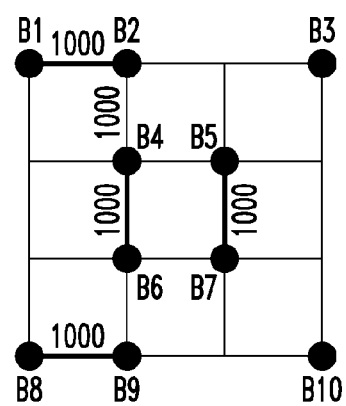
Figure 6E:
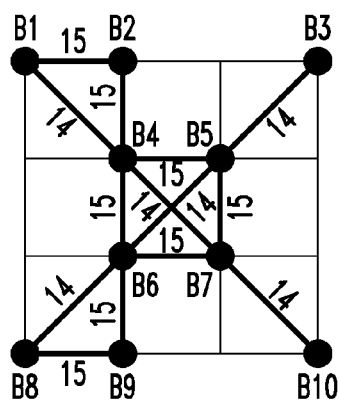
Figure 6F:
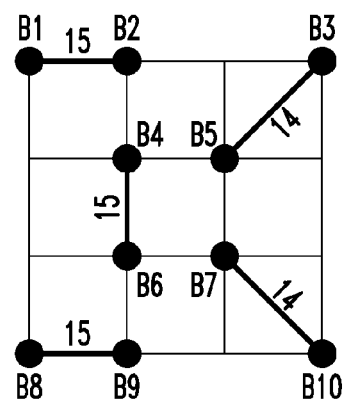

By way of review and provision of additional detail. FIG. 6A shows a BSM pin pairing problem with 10 BSM pins; FIG. 6B shows a graph constructed by adding edges between any two horizontal, vertical or diagonal adjacent pins; FIG. 6C shows one edge weight setting that gives high weight to horizontal and vertical edges; FIG. 6D shows a pairing result to FIG. 6C with the maximum weight matching approach. Although the total weight is maximized, two pins are not paired. FIG. 5E shows that the edge weights are set as in the BSM_Pin_Pairing technique, and FIG. 6F shows an optimal pairing solution.

Since the maximum weight matching will search for a matching solution with a maximum total weight, the edges with large weights are prone to be selected, i.e. the horizontal and vertical pairs have a higher priority to appear in the matching solution. However, if the weights are not assigned appropriately, some pairs may still be missed. As shown in FIG. 6C, the horizontal and/or vertical edges have a high weight 1000 and the diagonal edges have a low weight 1. If the maximum weight matching technique is applied on this graph, the pairing solution as shown in FIG. 6D will be obtained. In this solution, the weight is maximized to 4000, but it leaves two BSM pins un-paired. In the BSM_Pin_Pairing technique, carefully select the weights for horizontal and/or vertical and diagonal edges as shown in FIG. 6E, and it is guaranteed that the maximum weight matching is also a maximum cardinality matching. FIG. 6F gives the optimal solution with all BSM pins paired.

Now, a proof is presented to prove that the edge weight setting in the BSM_Pin_Pairing technique guarantees finding a BSM pin pairing solution satisfying all three constraints, as long as one feasible solution exists.

Proof: The constraint (1) is naturally satisfied through the neighboring graph construction. It will be proven that the solutions of the BSM_Pin_Pairing technique satisfy the constraints (2) and (3) by contradiction. Suppose for a BSM pin pairing problem, one optimal pairing solution P includes M horizontal and vertical pairs, and N diagonal pairs. Applying the BSM_Pin_Pairing technique, obtain a pairing solution P' with M' horizontal and vertical pairs, and N' diagonal pairs. Suppose P' is not an optimal solution; then;

$$M+N \geq M'+N' \text{ and } W_{hv} \cdot M + W_d \cdot N \leq W_{hv} \cdot M' + W_d \cdot N'.$$

Let $M+N=M'+N'+\alpha$, $\alpha \geq 0$. Then, obtain:

$$W_{hv} \cdot M + W_d \cdot N \leq W_{hv} \cdot M' + W_d \cdot (M+N-M'-\alpha).$$

Thus, $\alpha \cdot W_d/(W_{hv}-W_d) \leq (M'-M)$. If a=0, M+N=+N' and $M \leq M'$. Since P' is not an optimal solution, obtain M'<M. This leads to a contradiction. If $\alpha \geq 1$, since $W_{hv}=1+|E|$ and $W_d=|E|$, obtain $|E| \leq M'-M$. However, $M' \leq |E|/2$ which is a contradiction.

The neighboring graph has at most $O(8 \cdot |V|)$ edges. Thus, it takes $O(|V|^2)$ to build the graph. The edge weight setting only needs go through one edge once, and it takes $O(|E|)$. The core of BSM_Pin_Pairing is the maximum weight matching, and it can be finished in $O(|V|^3)$, as will be appreciated by the skilled artisan, given the teachings herein, and employing techniques from H. Gabow, An efficient implementation of Edmond's technique for maximum weight matching on graphs, Journal of the ACM, Vol. 23, Issue 2, pp. 221-234, April 1976; which is hereby expressly incorporated herein by reference in its entirety for all purposes. Therefore, the total BSM Pin Pairing run time is $O(|V|^3)$.

Theorem 2: the BSM_Pin_Pairing technique optimally solves the BSM pin pairing problem in O(|V|3), where |V| is the number of BSM pins.

BSM Pin Pair Assignment: After BSM pair assignment, the second step is to assign differential DIMM pairs to BSM pairs. One or more embodiments still draw on the network flow to derive the assignment solution. To satisfy the pairing constraints, treat each pair of nets as one super net. In this case, one super net routing actually requires a routing resource for two nets. Therefore, perform the net routing on the scaled graph. FIG. 7A shows a scale graph example of one layer. In this example, the light grid 704 is the original routing grid, while the dark grid 706 is the scaled graph. In the middle of the routing region, there is a blockage as shown by the gray rectangle 702. Any scaled grid edges crossing the blockage will be removed.

For paired DIMM pins and BSMs, let the middle point of a pair of DIMMs and/or BSMs be the pseudo DIMM and/or BSM pin location (i.e., the center of the ellipses in FIG. 7A). Then, the source node is connected to all the pseudo DIMM pins, and all the pseudo BSM pins are connected to the corresponding sub-sink nodes. Of course, the number of flows pushed on the scaled graph is the number of net pairs (i.e., half of the total nets). For the scaled graph, the edge capacity and node capacity are still one since it represents a super net (a pair of two nets). Using the scaled flow network graph, obtain a routing solution for all pairs as the thick lines shown in FIG. 8.

By way of review and provision of additional detail, FIG. 7A is a scaled graph of one routing layer. The light grid is the original routing grid, while the dark grid is the scaled graph. $\overline{B1}$, $\overline{B2}$, and $\overline{B3}$ are the centers of the BSM pin pairs, and D2 and D3 are the centers of the DIMM pairs. In FIG. 7B, the thick lines are the routing on the scaled graph. After splitting the routes on the scaled graph, the route to d4 crosses the routes to d5 and d6.

Now continuing, for any diagonal pair, the diagonal edges that cross the pair should be removed. In FIG. 7A, the two diagonal edges around D2 and B3, are removed. The reason is illustrated by an example in FIG. 7B, which is the left upper corner of FIG. 7A. Suppose the thick lines are the routing segments on the scaled graph. Since they have no crossing, they are legal routes on the scaled graph. After splitting the routing on the scaled graph, the thin lines show the routing to d3, d4, d5 and d6, respectively. However, the routing to d4 crosses the routing to d5 and d6. To avoid this kind of crossing, the diagonal edges that cross the pin pairs are removed.

Figure 8:
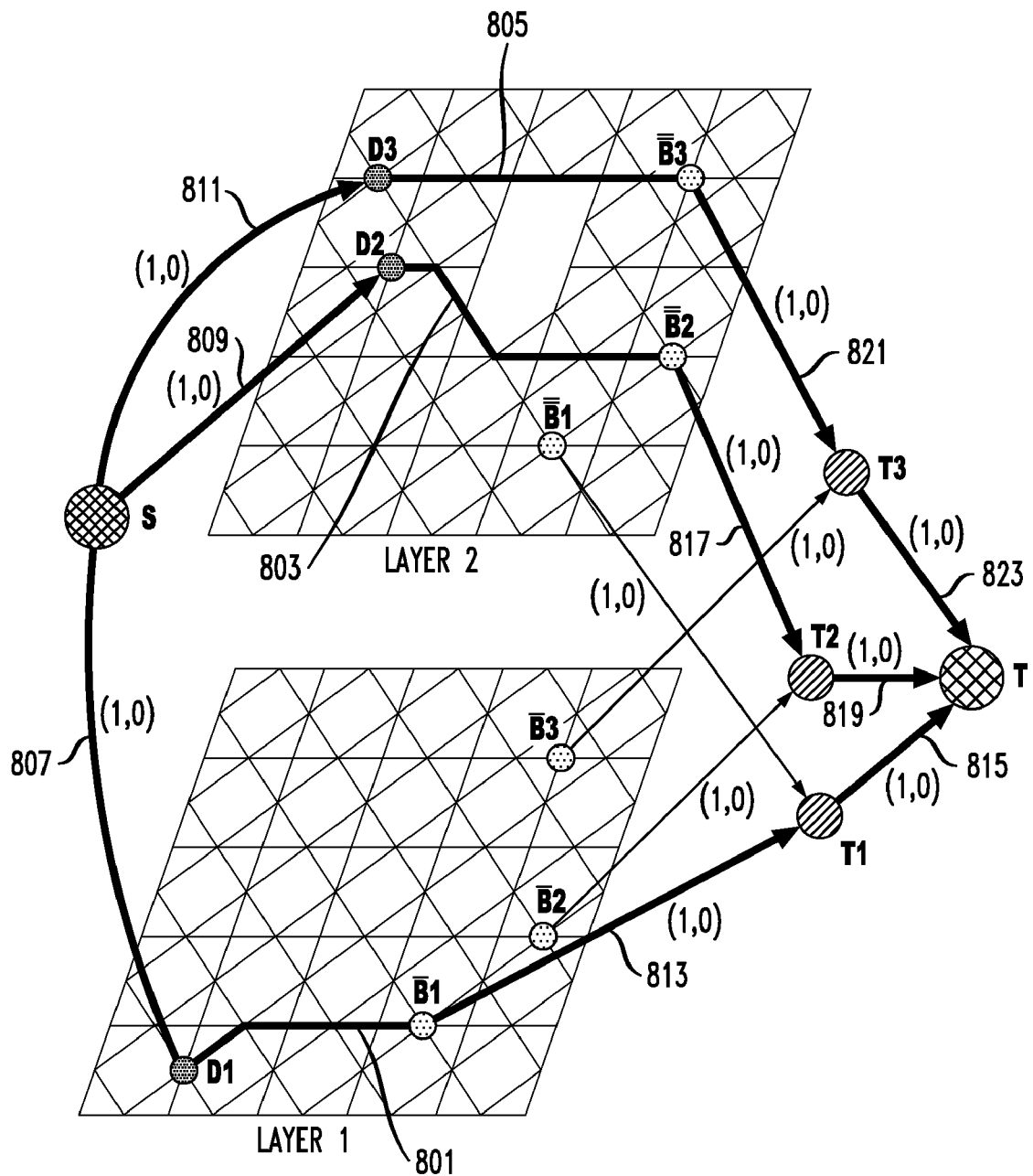
FIG. 8 depicts a flow network graph for a BARML problem with a scaled grid.
Figure 9A:
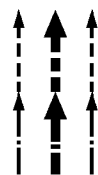
FIGS. 9A-9G depict seven routing cases when the first edge goes up.
Figure 9B:
Figure 9C:
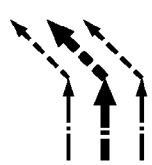
Figure 9D:
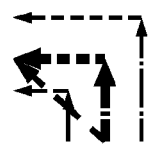
Figure 9E:
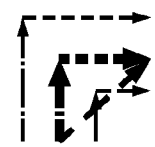
Figure 9F:
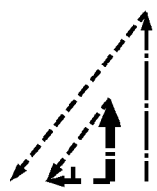
Figure 9G:
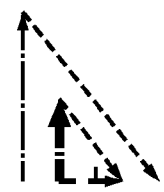

Once the scaled graph of each layer is built, they can be put together to obtain the flow network graph. The network graph construction is similar to that for BARML without pairing constraints, as discussed above. FIG. 8 shows the scaled network graph of one BARML problem with two layers. D1, D2 and D3 are the centers of three DIMM pairs. D1 is on Layer 1, and D2 and D3 are on Layer 2. There are three BSM pin pairs whose center are B1, B2 and B3, respectively. $\overline{B1}$, $\overline{B2}$, $\overline{B3}$ and $\overline{B1}$, $\overline{B2}$, $\overline{B3}$ are the copies of B1, B2 and B3 on Layer 1 and Layer 2, respectively $\overline{Bi}$ and $\overline{Bi}$ are connected to a subsink node $T_i$ (i=1, 2, 3). Since the capacity of the edge between a subsink node and the sink node is 1, Bi can only appear on one layer. By applying the min-cost max-flow technique (R. K. Abuja, T. L. Magnanti, and J. B. Orlin, Network Flows, Prentice Hall. 1993) on the flow network, obtain the pin assignment and routing between DIMM pairs and BSM pin pairs as shown by the thick lines in FIG. 8, which presents the flow network graph for a BARML problem with a scaled grid. The first number in the number pair is the edge capacity, and the second one is the cost.

The main flow of the BARML technique is summarized as follows:

Technique for Network Flow Based BARML(D, B, M, Pd)
1. $P_b$=BSM_Pin_Pairing(B);
2. Build scaled network flow graph $G_s$;
3. Apply min-cost-max-flow technique on $G_s$;
4. Split each flow on $G_s$ into two routes; and
5. Remove invalid routes.

Wire Splitting: Once the pair assignment and routing on the scaled graph are obtained, the next step is to split one path into two paths in the original routing grid. To complete this step, enumerate all possible routing patterns. FIGS. 9A-9G show all the possible cases when the first edge is going up (similar enumeration can be done for all other directions of the first edge). The thick arrows are the flow on the scaled graph, and the thin arrows are the split routes on the original graph. In particular, FIGS. 9A-9G show seven routing cases when the first edge goes up. The thick solid arrows are the flow on the scaled graph, and the thin arrows are the split paths on the original graph. Cases 9D-9G exist because of routing blockages. The dashed arrows show the solution when there are no blockages.

Notice that if there are no blockages, cases 9D-9G won't appear in the final solution. For cases 9D and 9E, a diagonal edge as the dashed arrow has a shorter wire length than the two horizontal and/or vertical edges. Similarly, one horizontal edge can get a shorter wire length for cases 9F and 9G. Since Network_Flow_Based_BARML calls a min-cost-max-flow technique to obtain the flow with the minimum wire length. Cases 9D-9G should not happen if no blockages are in the routing region. However, if blockages are present, in order to get the maximum flow, these four cases could occur.

Figure 10:
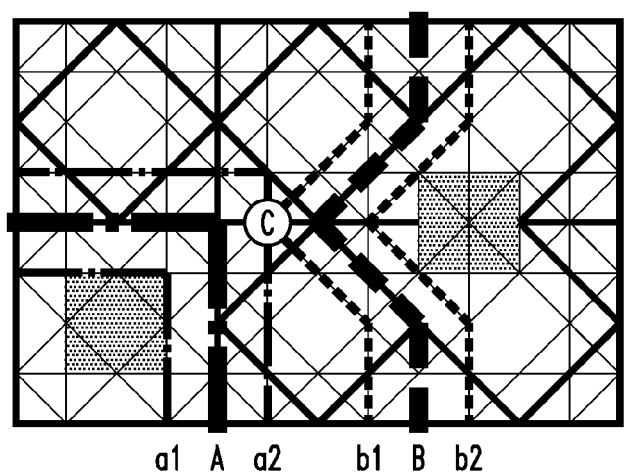
FIG. 10 depicts an example after splitting.

For most of the routes, the split paths are in good status. However, due to the detours of the routes, some split paths may have conflicts on the routing resource(s). FIG. 10 shows one example; after splitting, two routes a2 and b1 have a crossing. In this example, the thick lines are route A and route B on the scaled graph, respectively. After splitting A, obtain a1 and a2. The parameters b1 and b2 are obtained by splitting route B. However, a2 and b1 have a touching point C. This will make the routing solution invalid. Therefore, at the end of the Network-Flow_Based_BARML technique, or e more step is needed to detect and remove invalid paths.

Non-Limiting Experimental Results

An experimental embodiment was implemented in the C programming language, and tested on a LINUX workstation (2.6 GHz). The test cases are derived from industry designs. The table of FIG. 14 summarizes the basic information of the test cases. Among these five test cases, Test1 and Test2 do not have the differential pairing constraints.

The table of FIG. 15 shows the results of the two techniques (BARML_NO_Pairing and Network_Flow_Based_BARML). Assigned BSMs is the number of assigned BSM pins. For all these five test cases, the BSM assignments are completed. NoPairs refers to the runs that do not consider the pairing constraints. When the pairing constraints are not considered, the routing solution should have the minimum total wire length, i.e. the lower bound of the total wire length. WithPairs are the solutions with the differential pairing constraints. Comparing to the total wire length lower bound, the wire length increase is very small (<1%). This also validates the efficiency of the Network_Flow_Based_BARML technique. As for the runtime, all the runs except the NoPair run of Test5 can be finished in minutes. The running time for runs with pairing constraints is even faster because the underlying flow network is a scaled graph, and its size is much smaller. In practice, for these kind of test cases, designers have to carry out the pin pairing and/or assignment manually, and it takes several days to complete one design.

Figure 11:
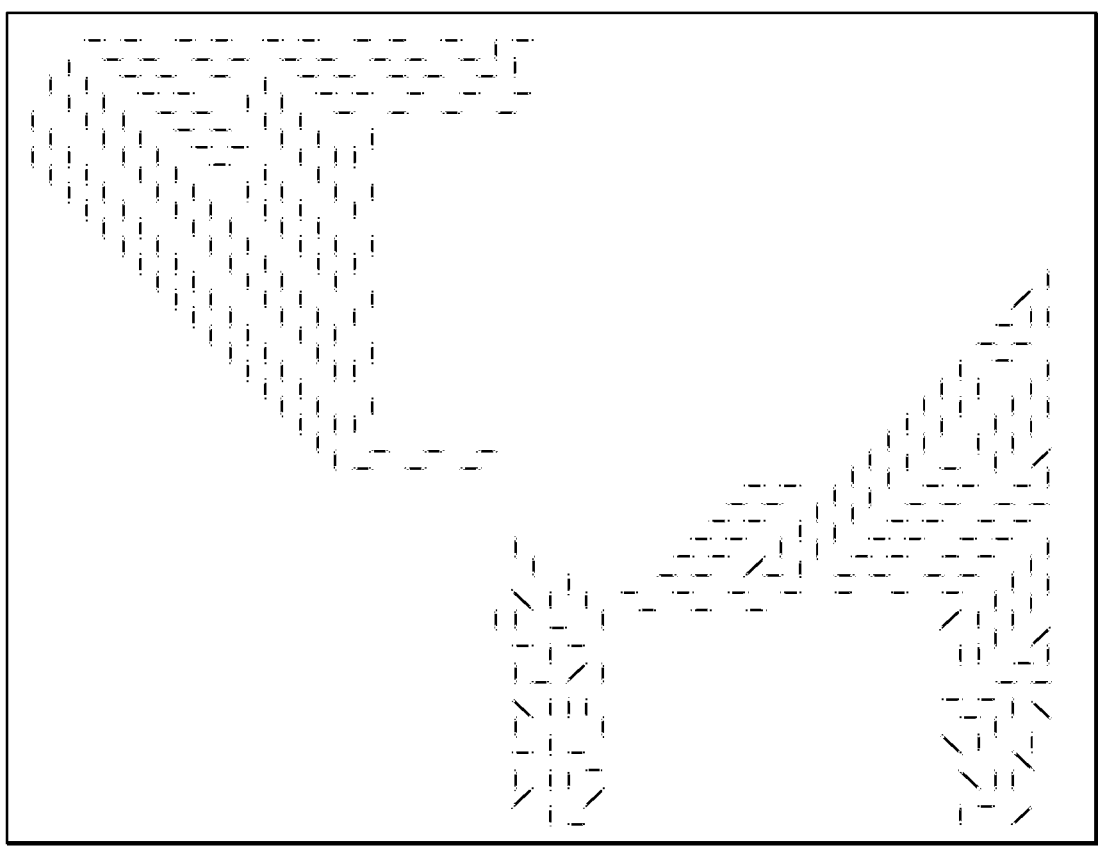
FIG. 11 depicts a Test1 BSM pin pairing solution.
Figure 12:
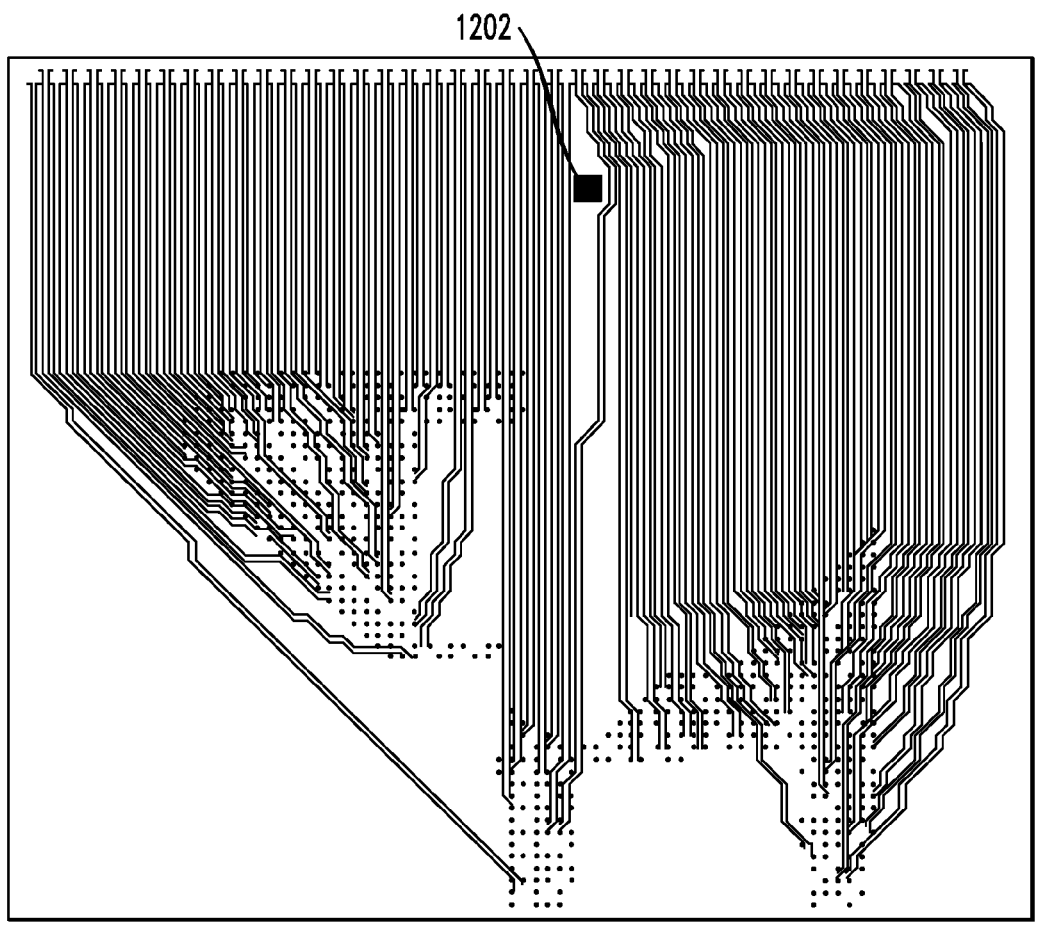
FIG. 12 depicts BSM pin assignment and routing on the Test 1 bottom layer.
Figure 13:
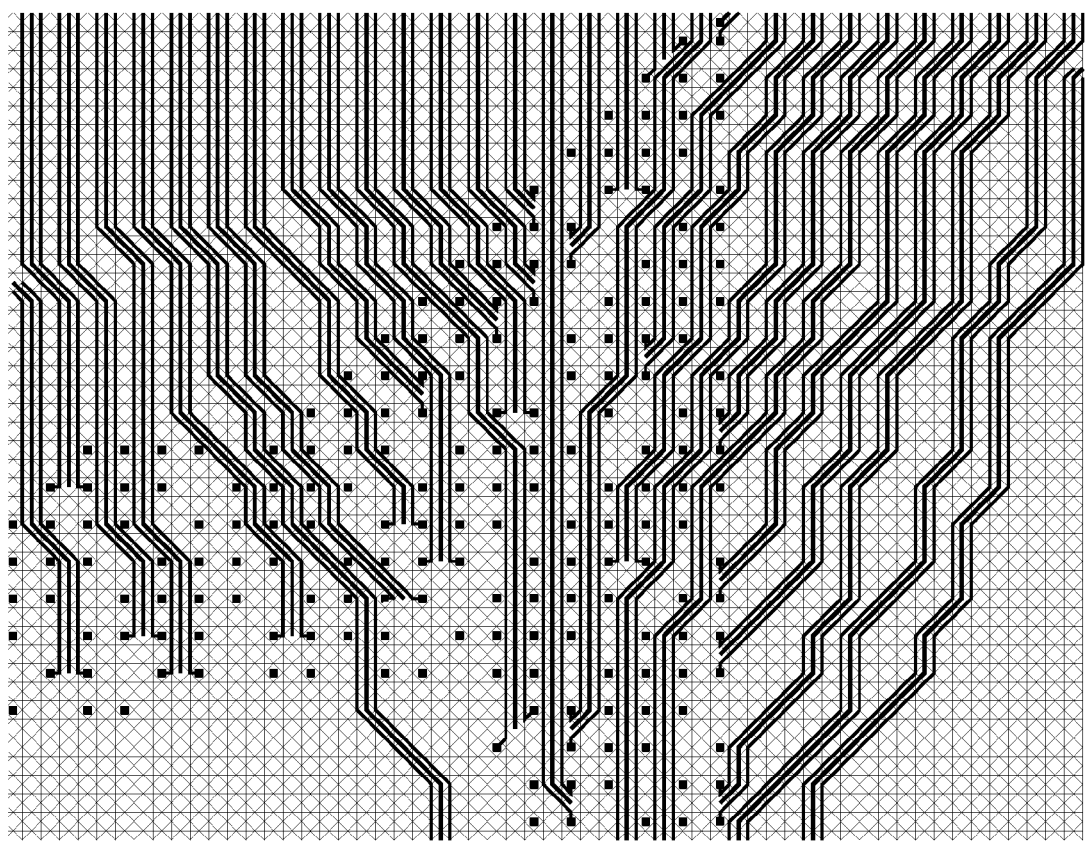
FIG. 13 depicts a portion of the routing solution of FIG. 12.

FIG. 11 shows the Test1 BSM pin pairing solution. All 624 BSM pins are paired successfully. FIG. 12 is the BSM pin assignment and routing solution on the Test1 bottom layer. The dark rectangle 1202 is the routing blockage. There are 78 net pairs routed on this layer. FIG. 13 shows a piece of the routing solution of FIG. 12. To illustrate the pairing constraints, the thick lines are the routing on the scaled graph, and the thin lines are the routing after splitting on the original grid. The dots are the BSM pins. The figure shows all BSM pins. Since only a pall of BSM pins are used by the bottom layer, there are many unconnected dots (i.e., those BSM pins are used by other layers).

Figure 17:
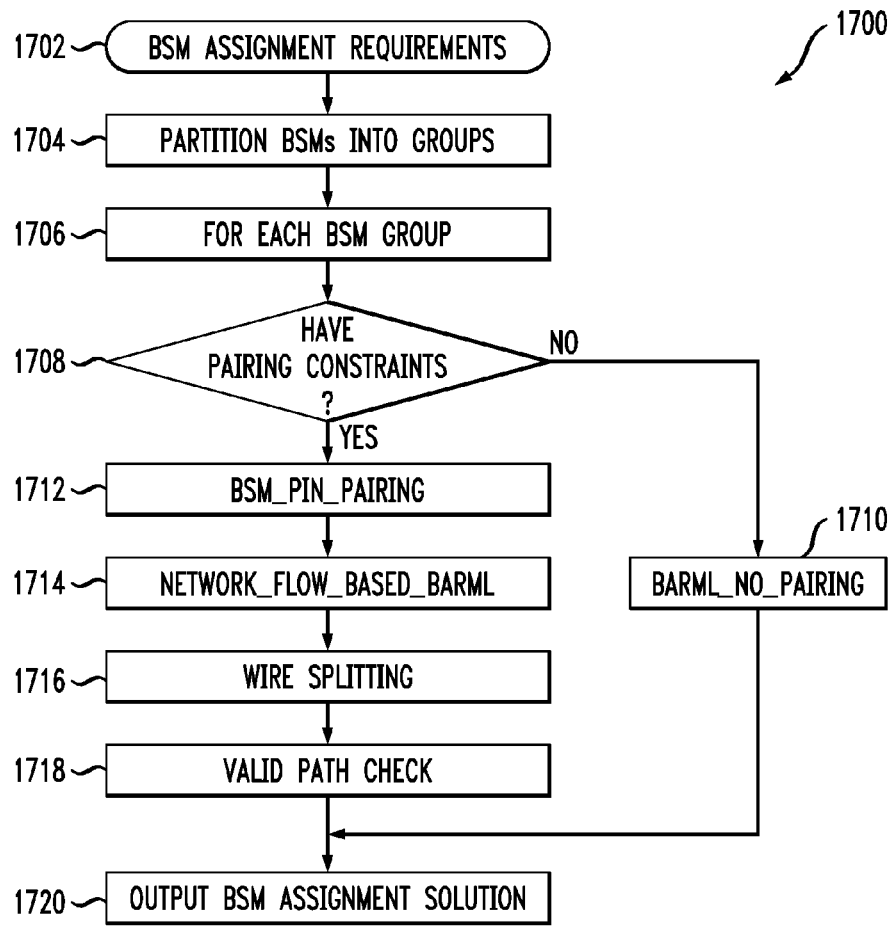
FIG. 17 is a flow chart of exemplary method steps, according to an aspect of the invention.

Attention should now be given to the flow chart 1700 of FIG. 17. In step 1702, BSM assignment requirements are obtained; for example, in the form of a netlist, pertaining to the whole board. These requirements may be obtained, for example, from one or more users, via a suitable input-output module. In step 1704, partition the BSMs into groups so that each group can work independently, without overlap. As indicated in step 1706, for each BSM group, carry out the remaining steps. In decision block 1708, determine whether there are pairing constraints. If not, as per the "N" branch, proceed to step 1710 and call the BARML_NO_Pairing module as discussed elsewhere. On the other hand, if there are pairing constraints, as per the "Y" branch, proceed to 1712 and call the BSM_Pin_Pairing module as discussed elsewhere herein, and then the Network_Flow_Based_BARML module in step 1714. Since Network_Flow_Based_BARML works on a scaled grid, in step 1716, restore to the original grid. Finally, in step 1718, check for validity of the paths. The BSM assignment solution is output in step 1720.

Conclusion and Recapitulation

One or more embodiments address BSM pin assignment on multiple layers with and/or without differential constraints. In the current industry practice, these kind of problems are handled manually, which takes a long time (measured by days) and significant design efforts.

One or more embodiments provide a network flow based technique which can optimally solve the general BSM pin assignment problems in minutes. For the BSM problem with differential pairing constraints, a two-step BSM assignment technique is provided. The first step is to find the optimal solution for BSM pairing. An optimal BSM pin pairing technique, which not only maximizes the BSM pin pairs, but also minimizes the number of diagonal pairs, is presented. The second step assigns BSMs based on a scaled network flow so that the pairing constraints are honored. The experimental results demonstrate the effectiveness and efficiency of our one or more embodiments.

It should be noted that one or more embodiments advantageously address BSM pin assignment on multiple routing layers; allow horizontal, vertical, and diagonal routing; provide an optimal pin-pairing technique which allows horizontal, vertical, and/or diagonal pin pairing; and/or address BSM pin assignment on a PCB (even with differential pairing constraints).

Reference should now be had again to FIGS. 1, 4 and 5 and the above discussion of BARML without pairing constraints. Given the discussion thus far, it will be appreciated that, in general terms, an exemplary method is provided, according to an aspect of the invention, for assigning bottom surface metal pins 114 to corresponding device pins on at least one outside device (e.g., 108), using multiple routing layers (e.g., Layer 1 and Layer 2 in FIG. 4), and without pairing constraints. The method includes constructing a network flow graph (e.g., FIG. 4) with a plurality of nodes and a plurality of edges. The plurality of nodes corresponding to:

- a device pin node D1, D2, D3 for each of the corresponding device pins;
- a node for each of the bottom surface metal pins on each of the multiple routing layers (e.g., $\overline{B1}, \overline{B2}, \overline{B3}$ on Layer 1 and $\overline{B1}, \overline{B2}, \overline{B3}$ on Layer 2);
- a source node S connected to each of the device pin nodes;
- a sub-sink node T1, T2, T3 for each of the bottom surface metal pins.
- each of the sub-sink nodes being connected to corresponding ones of the nodes for each of the bottom surface metal pins on each of the multiple routing layers; and
- a sink node T connected to the sub-sink nodes.

Additional steps include assigning a capacity and a cost to each of the edges of the network flow graph; applying a min-cost-max-flow technique to the network flow graph with the assigned capacities and costs to obtain an optimal flow solution; and assigning the bottom surface metal pins to the corresponding device pins, and routing connections there-between, in accordance with the optimal flow solution.

In some cases, an additional step includes fabricating an electronic module (for example, of the kind shown in FIG. 1) in accordance with the assignment of the bottom surface metal pins to the corresponding device pins and the routing connections there-between.

In some cases, in the step of assigning the capacity and the cost, a cost of zero is assigned to any given one of the edges that connects: the source node, the sink node, or one of the sub-sink nodes, to one of the device pin nodes or one of the nodes for each of the bottom surface metal pins on each of the multiple routing layers.

In some cases, in the step of assigning the capacity and the cost, a capacity of one is assigned to each of the edges.

In some instances, an additional step includes assigning a capacity of one to each of the nodes by splitting each of the nodes into an incoming node and an outgoing node, connected by an added edge with a capacity of one and a cost of zero, as shown in FIG. 5.

While the method is applicable in a variety of contexts, in some cases, in the constructing step, the device pin nodes are dual in-line memory module pin nodes, and the device(s) are DIMMs 108.

Reference should now be had again to FIGS. 1 and 6A-6F and the above discussion of differential pairing for BSM pins. Given the discussion thus far, it will be appreciated that, in general terms, another exemplary method is provided, according to another aspect of the invention, for pairing bottom surface metal pins. One step includes constructing a bottom surface metal pin neighboring graph, such as in FIG. 6B, with a plurality of nodes B1-B10 and a plurality of edges. The plurality of nodes correspond to the bottom surface metal pins 114. The plurality of edges connect neighboring pairs of the bottom surface metal pins.

Further steps include, as per FIG. 6E, for each of the edges connecting given neighboring pairs of the nodes that are diagonal neighbors, assigning a weight equal to the absolute value of the number of edges ($W_e=W_d$; $W_d|E|$); and, for each of the edges connecting given neighboring pairs of the nodes that are not diagonal neighbors, assigning a weight equal to one plus the absolute value of the number of the plurality of edges ($W_e=W_{hv}$; $W_{hv}=1+|E|$). Still further steps include applying a max-weight-matching technique to the bottom surface metal pin neighboring graph with the assigned weights to obtain a pairing result, as per FIG. 6F, and pairing the bottom surface metal pins in accordance with the pairing result.

Reference should now be had again to FIGS. 1, 7A, 7B, and 8 and the above discussion of BSM pin pair assignment. Given the discussion thus far, it will be appreciated that, in general terms, another exemplary method is provided, according to another aspect of the invention, for assigning paired bottom surface metal pins (e.g., b1-b2, b3-b4, and b5-b6) to corresponding paired device pins (e.g., d3-d4, d5-d6) on at least one outside device, using multiple routing layers (e.g., Layer 1 and Layer 2 in FIG. 8)

One step includes constructing a scaled network flow graph 706 including a plurality of nodes and a plurality of edges. The plurality of nodes correspond to:

- a pseudo device pin node D1, D2, D3 for each pair of the corresponding paired device pins;
- a pseudo bottom surface metal node for each pair of the bottom surface metal pins on each of the multiple routing layers (e.g., in FIG. 7, $\overline{B1}, \overline{B2}, \overline{B3}$ on Layer 1 and $\overline{B1}, \overline{B2}, \overline{B3}$ on Layer 2);
- a source node S connected to each of the pseudo device pin nodes;
- a sub-sink node T1, T2, T3 for each pair of the paired bottom surface metal pins; each of the sub-sink nodes is connected to corresponding ones of the pseudo bottom surface metal nodes for each of the pairs of bottom surface metal pins on each of the multiple routing layers; and
- a sink node T connected to the sub-sink nodes.

Further steps include assigning a capacity and a cost to each of the edges of the scaled network flow graph; applying a min-cost-max-flow technique to the scaled network flow graph with the assigned capacities and costs to obtain an optimal flow solution; and assigning the paired bottom surface metal pins to the corresponding paired device pins, and routing connections there-between, in accordance with the optimal flow solution.

In at least some cases, further steps include splitting each flow in the optimal flow solution obtained from applying the min-cost-max-flow technique to the scaled network flow graph into two routes on a non-scaled network flow graph 704 which represents the paired bottom surface metal pins and the corresponding paired device pins individually; and detecting and removing any invalid paths resulting from the splitting step. In such cases, the step of assigning the paired bottom surface metal pins to the corresponding paired device pins, and the routing connections there-between, takes into account the splitting step and the detecting and removing step.

The concept of a "flow" will be discussed further with respect to FIG. 8. The heavy lines 801, 803, 805 without arrowheads represent the flows determined by the min-cost-max-flow technique, and are on the grid. The heavy lines 807, 809, 811, 813, 815, 817, 819, 821, 823 with arrowheads are flows in some sense but are excluded as they are added artificially and are not on the grid. The flow solution is converted to the BSM solution by considering only the edges on the grid.

In at least some cases, additional steps include carrying out the differential pairing for the BSM pins as discussed above, to obtain a pairing result; the bottom surface metal pins are paired in accordance with the pairing result. Please note for the avoidance of confusion that when the differential pairing for the BSM pins is claimed in conjunction with the assigning of the paired bottom surface metal pins, the nodes and edges of the bottom surface metal pin neighboring graph, as discussed with respect to FIGS. 6A-6F, are referred to as "bottom surface metal pin neighboring graph nodes" and "bottom surface metal pin neighboring graph edges" to avoid confusion with the nodes and edges in the scaled network flow graph.

An additional step can include fabricating an electronic module (e.g., such as that in FIG. 1) in accordance with the assignment of the paired bottom surface metal pins to the corresponding paired device pins, and the routing connections there-between.

In some cases, in the step of assigning the capacities and the costs, a cost of zero is assigned to any given one of the edges connecting: the source node, the sink node, or one of the sub-sink nodes, to one of the pseudo device pin nodes or one of the pseudo bottom surface metal pin nodes on each of the multiple routing layers.

In some cases, in the step of assigning the capacities and the costs, a capacity of one is assigned to each of the edges.

In some cases, an additional step includes assigning a capacity of one to each of the nodes by splitting each of the nodes into an incoming node and an outgoing node, connected by an added edge with a capacity of one and a cost of zero.

While the method is applicable in a variety of contexts, in some cases, in the constructing step, the pseudo device pin nodes are pseudo dual in-line memory module pin nodes, and the device(s) are DIMMs 108.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 16:
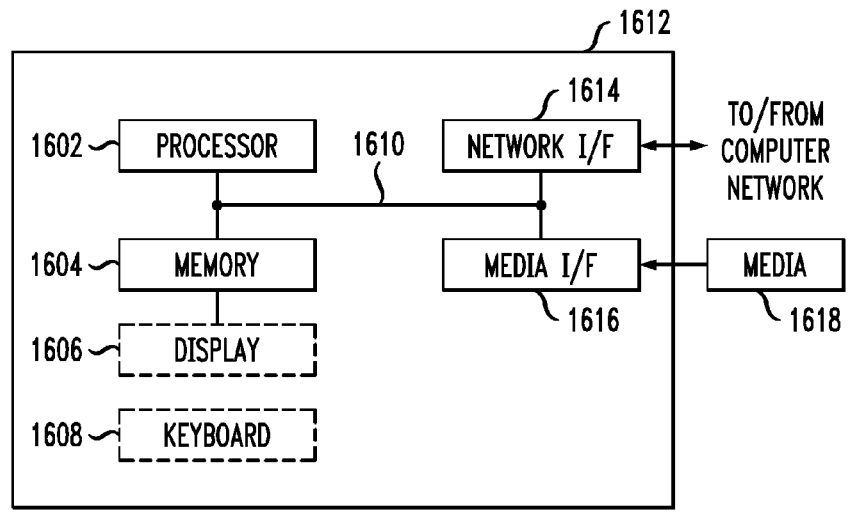
FIG. 16 depicts a computer system that may be useful in implementing one or more aspects and/or elements of the invention.

One or more embodiments can make use of software running on a general purpose computer or workstation. With reference to FIG. 16, such an implementation might employ, for example, a processor 1602, a memory 1604, and an input/output interface formed, for example, by a display 1606 and a keyboard 1608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example. RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1602, memory 1604, and input/output interface such as display 1606 and keyboard 1608 can be interconnected, for example, via bus 1610 as part of a data processing unit 1612. Suitable interconnections, for example via bus 1610, can also be provided to a network interface 1614, such as a network card, which can be provided to interface with a computer network, and to a media interface 1616, such as a diskette or CD-ROM drive, which can be provided to interface with media 1618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1602 coupled directly or indirectly to memory elements 1604 through a system bus 1610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1608, displays 1606, pointing devices, and the like) can be coupled to the system either directly (such as via bus 1610) or through intervening I/O controllers (omitted for clarity).

Network adapters such as network interface 1614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1612 as shown in FIG. 16) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. In one or more embodiments, a computer readable storage medium stores computer readable program code in a non-transitory manner.

A computer readable signal medium may include a propagated data signal with computer readable program code embodied therein, for example, in baseband or as part of a carrier wave. Such a propagated signal may take any of a variety of forms, including, but not limited to electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a BARML_NO_Pairing module, a BSM_Pin_Pairing module, and a Network_Flow_Based_BARML module. These modules can, in turn, include sub-modules. For example, the BSM_Pin_Pairing module can include a graph building sub-module, a weight-assigning sub-module, and a max-weight-matching solution engine sub-module. Furthermore, for example, the BARML_NO_Pairing module can include a graph-building sub-module, a capacity- and cost-assigning sub-module, a min-cost-max-flow solution engine sub-module, and a solution derivation sub-module to derive the BSM assignment and routing solution. Even further, for example, the Network_Flow_Based_BARML module can include the BSM_Pin_Pairing module as a sub-module in some cases, and can also include, for example, a graph-building sub-module (which could include cost and capacity assignment, or these could be in a separate sub-module), a min-cost-max-flow solution engine sub-module, a sub-module for flow splitting step 1716, and a sub-module for removing invalid routes as per step 1718. In other cases, these latter two sub-modules could be separate modules.

The method steps can then be carried out using the distinct software modules and/or sub-modules of the system, as described above, executing on one or more hardware processors 1602. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for assigning bottom surface metal pins to corresponding device pins on at least one outside device, using multiple routing layers, and without pairing constraints, said method comprising the steps of:
   constructing a network flow graph comprising a plurality of nodes and a plurality of edges, said plurality of nodes corresponding to:
      a device pin node for each of said corresponding device pins:
      a node for each of said bottom surface metal pins on each of said multiple routing layers;
      a source node connected to each of said device pin nodes;
      a sub-sink node for each of said bottom surface metal pins, each of said sub-sink nodes being connected to corresponding ones of said nodes for each of said bottom surface metal pins on each of said multiple routing layers; and
      a sink node connected to said sub-sink nodes;
   assigning a capacity and a cost to each of said edges of said network flow graph;
   applying a min-cost-max-flow technique to said network flow graph with said assigned capacities and costs to obtain an optimal flow solution; and
   assigning said bottom surface metal pins to said corresponding device pins, and routing connections there-between, in accordance with said optimal flow solution.

2. The method of claim 1, further comprising fabricating an electronic module in accordance with said assignment of said bottom surface metal pins to said corresponding device pins and said routing connections there-between.

3. The method of claim 1, wherein in said step of assigning said capacity and said cost, a cost of zero is assigned to any given one of said edges connecting:
   one of:
      said source node,
      said sink node, and
      one of said sub-sink nodes; to
   one of:
      one of said device pin nodes; and
      one of said nodes for each of said bottom surface metal pins on each of said multiple routing layers.

4. The method of claim 3, wherein, in said step of assigning said capacity and said cost, a capacity of one is assigned to each of said edges.

5. The method of claim 4, further comprising assigning a capacity of one to each of said nodes by splitting each of said nodes into an incoming node and an outgoing node, connected by an added edge with a capacity of one and a cost of zero.

6. The method of claim 1, wherein, in said constructing step, said device pin nodes comprise dual in-line memory module pin nodes.

7. The method of claim 1, further comprising providing a system, wherein the system comprises distinct software modules, each of the distinct software modules being embodied on a computer-readable storage medium, and wherein the distinct software modules comprise a graph-building module, a capacity- and cost-assigning module, a min-cost-max-flow solution engine module, and a solution derivation module;
   wherein:
      said constructing of said network flow graph is carried out by said graph-building module executing on at least one hardware processor;
      said assigning of said capacity and said cost is carried out by said capacity- and cost-assigning module executing on said at least one hardware processor;
      said applying of said min-cost-max-flow technique is carried out by said min-cost-max-flow solution engine module executing on said at least one hardware processor; and
      said assigning of said bottom surface metal pins to said corresponding device pins, and said routing connections there-between, is carried out by said solution derivation module executing on said at least one hardware processor.

8. A method for pairing bottom surface metal pins, said method comprising the steps of:
   constructing a bottom surface metal pin neighboring graph comprising a plurality of nodes and a plurality of edges, said plurality of nodes corresponding to said bottom surface metal pins, said plurality of edges connecting neighboring pairs of said bottom surface metal pins;
   for each of said edges connecting given neighboring pairs of said nodes that are diagonal neighbors, assigning a weight equal to absolute value of a number of said plurality of edges;
   for each of said edges connecting given neighboring pairs of said nodes that are not diagonal neighbors, assigning a weight equal to one plus said absolute value of said number of said plurality of edges;
   applying a max-weight-matching technique to said bottom surface metal pin neighboring graph with said assigned weights to obtain a pairing result; and
   pairing said bottom surface metal pins in accordance with said pairing result.

9. The method of claim 8, further comprising providing a system, wherein the system comprises distinct software modules, each of the distinct software modules being embodied on a computer-readable storage medium, and wherein the distinct software modules comprise a graph building module, a weight-assigning module, and a max-weight-matching solution engine module;
   wherein:

said constructing of said bottom surface metal pin neighboring graph is carried out by said graph building module executing on at least one hardware processor;

said assigning of said weights is carried out by said weight-assigning module executing on said at least one hardware processor; and said applying of said max-weight-matching technique is carried out by said max-weight-matching solution engine module executing on said at least one hardware processor.

10. A method for assigning paired bottom surface metal pins to corresponding paired device pins on at least one outside device, using multiple routing layers, said method comprising the steps of:

constructing a scaled network flow graph comprising a plurality of nodes and a plurality of edges, said plurality of nodes corresponding to:
- a pseudo device pin node for each pair of said corresponding paired device pins;
- a pseudo bottom surface metal node for each pair of said bottom surface metal pins on each of said multiple routing layers;
- a source node connected to each of said pseudo device pin nodes;
- a sub-sink node for each pair of said paired bottom surface metal pins, each of said sub-sink nodes being connected to corresponding ones of said pseudo bottom surface metal nodes for each of said pairs of bottom surface metal pins on each of said multiple routing layers; and
- a sink node connected to said sub-sink nodes;

assigning a capacity and a cost to each of said edges of said scaled network flow graph;

applying a min-cost-max-flow technique to said scaled network flow graph with said assigned capacities and costs to obtain an optimal flow solution; and assigning said paired bottom surface metal pins to said corresponding paired device pins, and routing connections there-between, in accordance with said optimal flow solution.

11. The method of claim 10, further comprising:

splitting each flow in said optimal flow solution obtained from applying said min-cost-max-flow technique to said scaled network flow graph into two routes on a non-scaled network flow graph which represents said paired bottom surface metal pins and said corresponding paired device pins individually; and detecting and removing any invalid paths resulting from said splitting step;

wherein said step of assigning said paired bottom surface metal pins to said corresponding paired device pins, and said routing connections there-between, takes into account said splitting step and said detecting and removing step.

12. The method of claim 11, further comprising:

constructing a bottom surface metal pin neighboring graph comprising a plurality of bottom surface metal pin neighboring graph nodes and a plurality of bottom surface metal pin neighboring graph edges, said plurality of bottom surface metal pin neighboring graph nodes corresponding to said bottom surface metal pins, said plurality of bottom surface metal pin neighboring graph edges connecting neighboring pairs of said bottom surface metal pins;

for each of said bottom surface metal pin neighboring graph edges connecting given neighboring pairs of said bottom surface metal pin neighboring graph nodes that are diagonal neighbors, assigning a weight equal to absolute value of a number of said plurality of bottom surface metal pin neighboring graph edges;

for each of said bottom surface metal pin neighboring graph edges connecting given neighboring pairs of said bottom surface metal pin neighboring graph nodes that are not diagonal neighbors, assigning a weight equal to one plus said absolute value of said number of said plurality of bottom surface metal pin neighboring graph edges; and applying a max-weight-matching technique to said bottom surface metal pin neighboring graph with said assigned weights to obtain a pairing result;

wherein said bottom surface metal pins are paired in accordance with said pairing result.

13. The method of claim 12, further comprising fabricating an electronic module in accordance with said assignment of said paired bottom surface metal pins to said corresponding paired device pins, and said routing connections there-between.

14. The method of claim 12, wherein in said step of assigning said capacities and said costs, a cost of zero is assigned to any given one of said edges connecting:

one of:
- said source node,
- said sink node, and
- one of said sub-sink nodes; to one of:
- one of said pseudo device pin nodes; and
- one of said pseudo bottom surface metal pin nodes on each of said multiple routing layers.

15. The method of claim 14, wherein, in said step of assigning said capacities and said costs, a capacity of one is assigned to each of said edges.

16. The method of claim 15, further comprising assigning a capacity of one to each of said nodes by splitting each of said nodes into an incoming node and an outgoing node connected by an added edge with a capacity of one and a cost of zero.

17. The method of claim 12, wherein, in said constructing step, said pseudo device pin nodes comprise pseudo dual in-line memory module pin nodes.

18. The method of claim 10, further comprising providing a system, wherein the system comprises distinct software modules, each of the distinct software modules being embodied on a computer-readable storage medium, and wherein the distinct software modules comprise a graph-building module, a min-cost-max-flow solution engine module, a flow splitting module, and an invalid route-removing module;

wherein:

said constructing of said scaled network flow graph is carried out by said graph-building module executing on at least one hardware processor;

said assigning of said capacity and said cost is carried out by said graph-building module executing on said at least one hardware processor; and said applying of said min-cost-max-flow technique is carried out by said min-cost-max-flow solution engine module executing on said at least one hardware processor.

19. An article of manufacture comprising a computer program product for assigning paired bottom surface metal pins to corresponding paired device pins on at least one outside device, using multiple routing layers, said computer program product comprising:

a non-transitory tangible computer-readable storage medium, storing in a non-transitory manner computer readable program code, the computer readable program code comprising:

computer readable program code configured to construct a scaled network flow graph comprising a plurality of nodes and a plurality of edges, said plurality of nodes corresponding to:
- a pseudo device pin node for each pair of said corresponding paired device pins;
- a pseudo bottom surface metal node for each pair of said bottom surface metal pins on each of said multiple routing layers;
- a source node connected to each of said pseudo device pin nodes;
- a sub-sink node for each pair of said paired bottom surface metal pins, each of said sub-sink nodes being connected to corresponding ones of said pseudo bottom surface metal nodes for each of said pairs of bottom surface metal pins on each of said multiple routing layers; and
- a sink node connected to said sub-sink nodes;

computer readable program code configured to assign a capacity and a cost to each of said edges of said scaled network flow graph;

computer readable program code configured to apply a min-cost-max-flow technique to said scaled network flow graph with said assigned capacities and costs to obtain an optimal flow solution; and computer readable program code configured to assign said paired bottom surface metal pins to said corresponding paired device pins, and routing connections there-between, in accordance with said optimal flow solution.

20. The article of manufacture of claim 19, further comprising:

computer readable program code configured to split each flow in said optimal flow solution obtained from applying said min-cost-max-flow technique to said scaled network flow graph into two routes on a non-scaled network flow graph which represents said paired bottom surface metal pins and said corresponding paired device pins individually; and computer readable program code configured to detect and remove any invalid paths resulting from said splitting step;

wherein said computer readable program code configured to assign said paired bottom surface metal pins to said corresponding paired device pins, and said routing connections there-between, takes into account said splitting step and said detecting and removing step.

21. The article of manufacture of claim 20, further comprising:

computer readable program code configured to construct a bottom surface metal pin neighboring graph comprising a plurality of bottom surface metal pin neighboring graph nodes and a plurality of bottom surface metal pin neighboring graph edges, said plurality of bottom surface metal pin neighboring graph nodes corresponding to said bottom surface metal pins, said plurality of bottom surface metal pin neighboring graph edges connecting neighboring pairs of said bottom surface metal pins;

computer readable program code configured to, for each of said bottom surface metal pin neighboring graph edges connecting given neighboring pairs of said bottom surface metal pin neighboring graph nodes that are diagonal neighbors, assign a weight equal to absolute value of a number of said plurality of bottom surface metal pin neighboring graph edges;

computer readable program code configured to, for each of said bottom surface metal pin neighboring graph edges connecting given neighboring pairs of said bottom surface metal pin neighboring graph nodes that are not diagonal neighbors, assign a weight equal to one plus said absolute value of said number of said plurality of bottom surface metal pin neighboring graph edges; and computer readable program code configured to apply a max-weight-matching technique to said bottom surface metal pin neighboring graph with said assigned weights to obtain a pairing result;

wherein said bottom surface metal pins are paired in accordance with said pairing result.

22. The article of manufacture of claim 21, wherein in said computer readable program code configured to assign said capacities and said costs, a cost of zero is assigned to any given one of said edges connecting:

one of:
- said source node,
- said sink node, and
- one of said sub-sink nodes; to one of:
- one of said pseudo device pin nodes; and
- one of said pseudo bottom surface metal pin nodes on each of said multiple routing layers.

23. The article of manufacture of claim 22, wherein, in said computer readable program code configured to assign said capacities and said costs, a capacity of one is assigned to each of said edges.

24. The article of manufacture of claim 23, further comprising computer readable program code configured to assign a capacity of one to each of said nodes by splitting each of said nodes into an incoming node and an outgoing node, connected by an added edge with a capacity of one and a cost of zero.

25. The article of manufacture of claim 21, wherein, in said computer readable program code configured to construct, said pseudo device pin nodes comprise pseudo dual in-line memory module pin nodes.

* * * * *